(No Model.)
N. W. BLEVENS.
WAGON AXLE.
No. 382,211. Patented May 1, 1888.
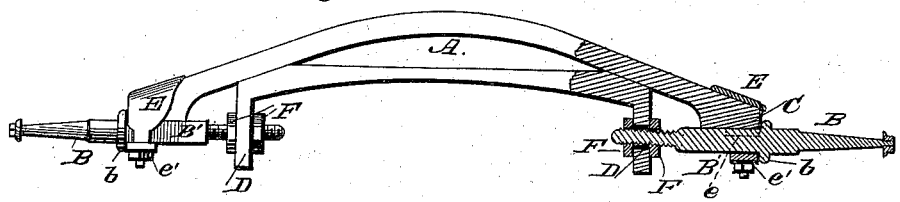
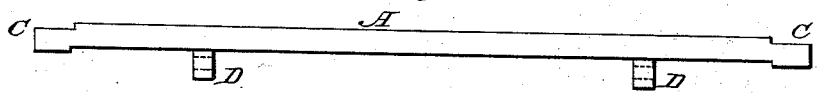
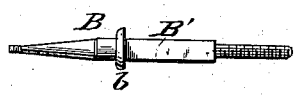 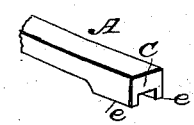
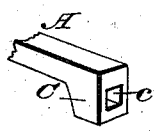
WITNESSES:
Fred G. Dieterich
P. B. Turpin.
INVENTOR:
N. W. Blevens
BY Munn & Co.
ATTORNEYS.

United States Patent Office.

NATHAN W. BLEVENS, OF AURORA, TEXAS, ASSIGNOR OF ONE-HALF TO WAYNE D. TREWHITT, OF SAME PLACE.

WAGON-AXLE.

SPECIFICATION forming part of Letters Patent No. 382,211, dated May 1, 1888.

Application filed November 15, 1887. Serial No. 255,274. (No model.)

*To all whom it may concern:*

Be it known that I, NATHAN W. BLEVENS, of Aurora, in the county of Wise and State of Texas, have invented a new and useful Improvement in Axles, of which the following is a specification.

This invention is an improved axle, and has for its object to provide an adjustable axle for wagons, buggies, carts, and other wheeled vehicles, which will be cheap, durable, may be readily adjusted, and may be conveniently repaired.

The invention consists in certain features of construction and novel combinations of parts, as will be described and claimed.

In the drawings, Figure 1 shows my invention embodied in a double axle, parts being broken away and others shown in section. Fig. 2 is a detail view of a single axle constructed according to my invention. Fig. 3 is a detail view of the axle end or spindle. Fig. 4 is a detail end view of the axle or main portion; and Fig. 5 shows a somewhat different construction of end seat, as will be described.

My device comprises a body portion or axle, A, and spindles B connected therewith, in the manner presently described.

The axle A may be formed double, as shown in Fig. 1, or single, as shown in Fig. 2. It is provided at its ends with seats C, and a short distance in from said ends with seats D. The seats D are lugs depending from the under side of the axle and having openings $d$ formed through them for the passage of the shank of the spindle. The seats C may be lugs depending from the axle at its ends and having openings $c$ formed through them, as shown in Fig. 5; but such seats are usually as shown in Figs. 1, 2, and 3, consisting of the short ears $e$, depending from the ends of the axle at the opposite sides thereof, and the clips E, fitted over the end of the axle and provided with securing-nuts $e'$, as shown.

The spindle B has a collar or flange, $b$, and is provided in rear thereof with the shank $B'$, preferably made angular in cross-section, where it fits in the seat C, and having its point $b'$ fitted to pass through the opening $d$ in seat D, and threaded to receive the nuts F F, turned on the threaded portion $b'$ on opposite sides of the seat-lug D, so the spindle may be secured and may be adjusted as desired.

In use the spindle, with the nuts F removed, has its shank inserted through the seat C. When such seat is made as shown in Fig. 5, one nut F is applied and turned back from its inner end, and such end is inserted through the seat D and the other nut F applied, when, by properly turning said nuts, the spindle may be adjusted in or out, as desired.

In the use of the invention with the construction of seat C shown in Fig. 1 the operation is the same as that above described, except that, if desired, one of the nuts F may be applied to the shank $B'$ before such shank is applied to seat C.

By my invention the same wagon may be set to standard or narrow gage, as desired.

It will be understood that the axles can be made in any shape or form, also that a smith will not be required to place, remove, or adjust the spindles, as such operation can be effected by any one who can handle a wrench, such tool being the only one necessary to the manipulation of the parts.

Having thus described my invention, what I claim as new is—

1. The combination, with an axle having a seat at its outer end and a seat located in from said outer end, of the spindle having its shank provided with a threaded inner end, and nuts turned on said inner end on opposite sides of the inner seat, by which the spindle may be adjusted to and held in any desired position, substantially as set forth.

2. The combination of the axle having seat-lug D arranged in from its ends and provided with the ears $e$ depending from its opposite sides at its end, the spindle having its shank formed to fit between said ears and having its point threaded, the clip E, and the nuts F F, substantially as set forth.

NATHAN W. BLEVENS.

Witnesses:
J. B. COLVILLE,
G. T. TYLER.